(12) United States Patent
Humphreys et al.

(10) Patent No.: US 7,047,233 B1
(45) Date of Patent: May 16, 2006

(54) INFORMATION DIRECTORY SYSTEM

(75) Inventors: Richard Macartan Humphreys, Mount Merrion (IE); Barry Smyth, Dublin (IE); Michael Kennedy, Dublin (IE)

(73) Assignee: Today's Pages Limited, County Dublin (IR)

( * ) Notice: Subject to any disclaimer, the term of this patent is extended or adjusted under 35 U.S.C. 154(b) by 571 days.

(21) Appl. No.: 09/695,219

(22) Filed: Oct. 25, 2000

(30) Foreign Application Priority Data

Jul. 6, 2000 (EP) ............................................ 00650076

(51) Int. Cl.
*G06F 17/30* (2006.01)

(52) U.S. Cl. .......................... 707/3; 707/1; 707/5; 707/6
(58) Field of Classification Search ...................... 707/3, 707/10, 5, 6, 201, 205, 2; 705/1, 14, 37, 40
See application file for complete search history.

(56) References Cited

U.S. PATENT DOCUMENTS

| | | | | | |
|---|---|---|---|---|---|
| 5,960,422 | A | * | 9/1999 | Prasad ............................. | 707/2 |
| 6,189,003 | B1 | * | 2/2001 | Leal ................................ | 707/2 |
| 6,292,792 | B1 | * | 9/2001 | Baffes et al. ................... | 706/45 |
| 6,434,554 | B1 | * | 8/2002 | Asami et al. .................... | 707/4 |
| 2001/0044837 | A1 | * | 11/2001 | Talib et al. ...................... | 709/219 |
| 2002/0010651 | A1 | * | 1/2002 | Cohn et al. ..................... | 705/26 |
| 2002/0032677 | A1 | * | 3/2002 | Morgenthaler et al. ......... | 707/3 |
| 2002/0035474 | A1 | * | 3/2002 | Alpdemir ....................... | 704/270 |
| 2002/0035556 | A1 | * | 3/2002 | Shah et al. ...................... | 707/1 |
| 2002/0065769 | A1 | * | 5/2002 | Irribarren et al. .............. | 705/37 |
| 2002/0073105 | A1 | * | 6/2002 | Noguchi et al. ............. | 707/200 |
| 2002/0133459 | A1 | * | 9/2002 | Polk et al. ..................... | 705/40 |
| 2002/0165851 | A1 | * | 11/2002 | Fernades et al. ............... | 707/3 |

OTHER PUBLICATIONS

Morgenthaler Jeff, U.S. Appl. No. 09/516,901, "methods for creating, displaying and updating searchable grahical index and searching graphical indexes".*
Morgenthaler, Jeff "Method for crating, displaying and updating searching graphical index and searching graphical indexes"(Exhibit A).*

* cited by examiner

*Primary Examiner*—Jean M. Corrielus
(74) *Attorney, Agent, or Firm*—Buchanan Ingersol PC

(57) ABSTRACT

A method of providing information in a directory system comprising a directory for company information, goods and services; a communications network; a directory computer operated by a directory provider; a plurality of search computers operated by enquirers which search computers are connected within the network; and a plurality of active content providers operating active content provider computers, at least some of which are connected to the directory computer. The company information, goods and services are classified by unique identifiers. Lists of goods and services and company information are provided as provider content from both active and passive content providers. These are stored in a provider database with unique identifiers. The directory computer on request downloads to the search computer one or more queries to allow the search computer specify the search correctly and then the directory computer downloads the search result. The active content provider computers update the search from time to time. The purpose is to provide a comprehensive listing of useful information to an enquirer in an easily searched form while simultaneously allowing the active content providers to tailor the information supplied.

82 Claims, 20 Drawing Sheets

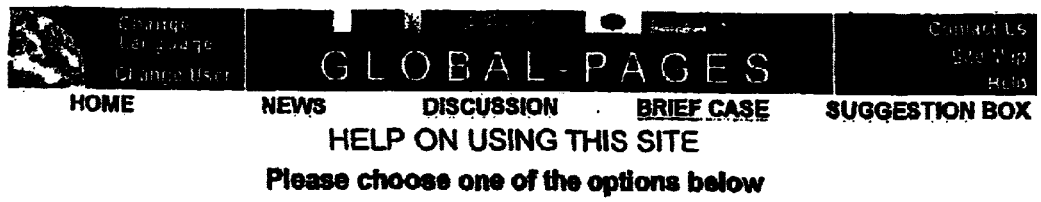

HOME    NEWS    DISCUSSION    BRIEF CASE    SUGGESTION BOX

HELP ON USING THIS SITE

Please choose one of the options below

- Search for a company
  - By Name
  - You want to buy from
  - You want to sell to
  - You want to research
  - You want to partner with
  - You want to work with
  - With Special Offers
  - With Special Business Opportunities
- Using the News Room
- Using the Discussion Room
- Using your Brief Case
- Changing the language option

 Searching for a company

There are several different ways that you can use this site to search for companies. The search facility combines 5 directories in one source - buying, selling, researching, partnering and employment. For each of these searches, the user is asked a number of questions to narrow down the search criteria and produce a list of suitable companies. The questions that are asked and the results that are shown for each type of search have been carefully tailored

Fig. 4 to suit that particular kind of search for more information on the these searches see the individual search headings below.

■ Searching for a Company By Name

It is possible to search for a company by name alone, by just entering the name in the box provided on the home page and clicking the search button. All companies with match the name in the box will be returned in the company listings page. When using this search facility it is best to be as accurate as possibe with the name as this will narrow down the number of possible companies returned.

■ Search for a company to buy from

■ Searching for companies to sell to

■ Researching companies

■ Search for companies to partner with

■ Searching for employment

■ Special Offers

■ Special Business Opportunities

■ Using the News Room

■ Using the Discussion Room

■ Using you Brief Case

Option

{below}

Home | News | Discussion | Brief Case | Suggestion Box | Contact us | Site Map | Help copyright © 2000 global-pages.com

Fig. 6

GLOBAL-PAGES

Change Language | Change User | HOME | NEWS | DISCUSSION | BRIEF CASE | SUGGESTION BOX | Contact Us | Site Map | Help
BUY | SELL | PARTNER | RESEARCH | EMPLOYMENT Number of results : 4,430,4567       Show Results

CURRENT SEARCH CRITERIA

I want to buy from...

Please select from the following Company Types and click Continue [ DESELECT ALL ]

▶ Company Type

| ☑ Manufacturer | ☑ Service Provider | ☑ Warehouse Service |
| ☑ Trading House | ☑ Service Buyer | ☑ Transport Service |
| ☑ Regional Importer | ☑ Franchisor | ☑ Sales Agent |
| ☑ National Distributor | ☑ Franchisee | ☑ After Sales Agent |
| ☑ Local Distributor | ☑ Auction Site | ☑ Used Goods Dealer |
| ☑ Retailer | ☑ IP Provider | |
| ☑ E-Commerce Site | ☑ IP Buyer | ☑ Private Customer |
| | | ☑ Other |

Search Category
Buy

Home | News | Discussion | Brief Case | Suggestion Box | Contact us | Site Map | Help copyright © 2000 global-pages.com

Fig. 7

GLOBAL-PAGES

HOME  NEWS  DISCUSSION  BRIEF CASE  SUGGESTION BOX
BUY  SELL  PARTNER  RESEARCH  EMPLOYMENT

Number of results : 2,430,4567      Show Results

CURRENT SEARCH CRITERIA

I want to buy from...

Please select country/countries and click Continue

▶ Location
Countries

A B C D E F G H I J K L M N O P Q R S T U V W X Y Z

Company Type
Retailer

To go directly to a country select the first letter from the list above

Search Category
Buy

▲ A

☐ Albania      ☐ Antigua and Barbuda   ☐ Australia
☐ Algeria                              ☐ Austria
☐ Andorra     ☐ Argentina              ☐ Azerbaijan
              ☐ Armenia Click on Criteria Categories to edit criteria

▲ B

☐ Bahamas     ☐ Belgium    ☐ Botswana
☐ Bahrain     ☐ Belize     ☐ Brazil
☐ Bangladesh  ☐ Bhutan     ☐ Brunei
☐ Barbados    ☐ Bolivia    ☐ Bulgaria
☐ Belarus     ☐ Bosnia and ☐ Burkina Faso
              Herzegovina

▲ C

☐ Cambodia    ☐ China      ☐ Cuba
☐ Cameroon    ☐ Colombia   ☐ Cyprus
☐ Canada      ☐ Comoros    ☐ Czech Republic
☐ Chad        ☐ Costa Rica ☐ Côte d'Ivoire
☐ Chile       ☐ Croatia

▲ D

☐ Denmark     ☐ Dominica   ☐ Dominican Republic

▲ E

☐ Ecuador     ☐ El Salvador       ☐ Estonia
☐ Egypt       ☐ Equatorial Guinea ☐ Ethiopia

GLOBAL-PAGES

Change Language
Change User

HOME | NEWS | DISCUSSION | BRIEF CASE | SUGGESTION BOX
BUY | SELL | PARTNER | RESEARCH | EMPLOYMENT

Contact Us
Site Map
Help

Number of results : 80,327          Show Results

CURRENT SEARCH CRITERIA

▶ Product/Service

Location
Italy
Paris (France)

Company Type
Retailer

Search Category
Buy

I want to buy the following ...

Product/Service: [        ]

Click on Criteria Categories to edit criteria

Home | News | Discussion | Brief Case | Suggestion Box | Contact us | Site Map | Help copyright © 2000 global-pages.com

Fig. 10

GLOBAL-PAGES

HOME    NEWS    DISCUSSION    BRIEF CASE    SUGGESTION BOX

BUY    SELL    PARTNER    RESEARCH    EMPLOYMENT

Number of results: 1,431

Show Results

CURRENT SEARCH CRITERIA

▶ Product/Service
shoes

I want to buy ...
Product/Service: shoes
Refine Product/Service Description (optional):

Location
Italy
Paris (France)

Please untick box to deselect product category (optional) [ DESELECT ALL ]

Company Type
Retailer

☑ Beach shoes [1]
☑ Shoes, gymnastic [3]
☑ Decoration for hats and shoes [1]
☑ Shoes, ladies [30]
☑ Hiking shoes [13]
☑ Shoes, mens [24]
☑ Shoes - industrial machinery [5]
☑ Shoes, sports and leisure [30]
☑ Shoes for sensitive feet [7]
☑ Shoes, tennis [1]
☑ Shoes, dancing [5]
☑ Shoes, training [3]
☑ Shoes, golf [4]
☑ Other product categories related to shoes [5]

Search Category
Buy

Click
on Criteria
Categories to
edit criteria

Home | News | Discussion | Brief Case | Suggestion Box | Contact us | Site Map | Help copyright © 2000 global-pages.com

Fig. 11

GLOBAL-PAGES

HOME    NEWS    DISCUSSION    BRIEF CASE    SUGGESTION BOX

BUY    SELL    PARTNER    RESEARCH    EMPLOYMENT

Number of results:
1,259

Show Results

CURRENT SEARCH CRITERIA

▶ Screen Result

(Optional) Show only companies with:

| Revenue us$ | Employees | Other |
|---|---|---|
| ☐ > 10 million | ☐ > 10,000 | ☐ e-commerce facilities |
| ☐ 1 - 10 million | ☐ 1,000 - 10,000 | ☐ environmentally aware |
| ☐ 1/2 - 1 million | ☐ 200 - 1,000 | ☐ quality mark |
| ☐ 250- 500 K | ☐ 50 - 200 K | ☐ group procurement member |
| ☐ < 250 K | ☐ < 50 | |

Product/Service
shoes
ladies

Location
Italy
Paris (France)

Company Type
Retailer

Search Category
Buy

Click on Criteria Categories to edit criteria

Home | News | Discussion | Brief Case | Suggestion Box | Contact us | Site Map | Help copyright © 2000 global-pages.com

Fig. 13

GLOBAL PAGES

Change Language
Change User

HOME | NEWS | DISCUSSION | BRIEF CASE | SUGGESTION BOX
BUY | SELL | PARTNER | RESEARCH | EMPLOYMENT

Contact Us
Site Map
Help

Number of results : 39

Show Results

Rank results by

○ Alphabetical Listing
○ Revenue
○ Number of Employees

CURRENT SEARCH CRITERIA

▶ Rank Results

Screen Result
e-commerce

Product/Service
shoes
ladies

Location
Italy
Paris (France)

Company Type
Retailer

Search Category
Buy

Click on Criteria Categories to edit criteria

Home | News | Discussion | Brief Case | Suggestion Box | Contact us | Site Map | Help copyright © 2000 global-pages.com

Fig. 14

| | | |
|---|---|---|
| Change Language / Change User | GLOBAL PAGES DISCUSSION ROOM | Contact Us / Site Map / Help |
| HOME | NEWS DISCUSSION BRIEF CASE | SUGGESTION BOX |

Welcome to your Personalised Discussion Room

Over 100 years - Providing Comfort For Hard to Fit Feet — Since 1899

This Discussion Room is hosted by the <u>Swiss Association of Shoe Manufacturers</u>

Shoe Manufacturing Discussion Room

Topic: Unfair Competition From Asian Shoe Manufacturers

Add Comment to Discussion Here and then click Submit:

[                                                                    ]

June 2 2000, from W. Dogge, E.U. Quota Office (BEL)
I have completed my examination of this issue and Taiwan has in fact breached its quota by 10,000 pairs. Their quota for calendar year 2000 has accordingly been reduced from 200,000 to 190,000 by order No. QR11437 from this office signed today.

May 28 2000, from Y. Butte, Fancy Shoes Co., (IRL)
Yes but what about the issue of Taiwan exceeding its 200,000 quota?

May 22 2000, from B. Bee, Colorado Loafers Inc. (USA)
I have checked out the UK Stats Office and the figure of 674,000 includes 210,000 pairs from Taiwan who have an annual quota of 200,000 pairs. This means that mainland China only exported 464,000 pairs which is less than their quota of 500,000 pairs.
Bottom line is we do not have a problem here with Mainland China.

May 16 2000, from I Know, We All Know Inc. (NL)
The EU quote office in Brussels http://www.euquotes.com should be informed about this following which they will reduce next years's quota for China.

May 14 2000, from E. Forsyth, Clerk & Co. (U.K.)
With reference to J. Brown's comment dated May 11th, we understand that the last year's quota from China of 0.5m pairs of shoes was

DISCUSSION ROOMS BOOKMARKED

<u>Shoe Manufacturing</u>

<u>Interest Rate Trends</u>

<u>Fashion</u>

<u>Textile Industry</u>

<u>EU Consumer Protection Legislation</u>

<u>Edit Bookmarks</u>

Fig. 16 breached and that 674,000 pairs were imported into the EU area from china for the year ended Dec. 31 1999. This information is available from the U.K. Statistics Office http://www.ukstats.co.uk. Who is responsible for preventing such imports occuring?

Home | News | Discussion | Brief Case | Suggestion Box | Contact us | Site Map | Help copyright © 2000 global-pages.com

Fig. 17

INFORMATION DIRECTORY SYSTEM

BACKGROUND OF THE INVENTION

1. Field of the Invention

The present invention relates to a method of providing information in a directory system comprising a directory for company information, goods and services; a communications network; a directory computer operated by a directory provider; a plurality of search computers operated by enquirers which search computers are connected within the network; and a plurality of active content providers operating active content provider computers, at least some of which are connected to the directory computer.

The term "company" is used loosely and is not to be correlated directly with a limited company or Plc as such or, for example, any other form of private organisation but is to encompass any form of organisation whether it be a limited company, a corporation, a partnership, a charitable organisation, a teaching organisation or indeed any public organisation, whether it be a government department or some State run operation. The term "company" is used loosely to refer to even sole traders and individuals.

Further, any reference to information on goods and services also refers directly to company information, however, rather than always using phrases such as "information pertaining to the company information" and "information on the goods and services", the reference may be simply to information on the goods and services of a particular provider and where the context permits, it has to be read to include actual physical company information.

2. Background of the Invention

As the information on the Internet expands, it is becoming more and more difficult for people to obtain the information required. Therefore, they are forced to use many search engines which search engines can be difficult to use and navigate.

Particularly for businesses and for people wishing to buy from businesses, the unstructured nature of the manner in which companies web pages and information is held on the internet, cause great difficulty. The supplier of company information, goods and services wishes to make contact readily easily with customers and at the same time, customers wish to make contact with the companies. Further, people wish to contact companies for different purposes such as, for example, people who wish to be employed by companies, people who wish to sell services or goods to companies, or people who wish to buy from companies.

One of the problems for any searcher is the difficulty in restricting the search to obtain details about companies that are of interest to them. A further problem for most people is that when information is changed by companies, it is very difficult to have updates of such information. Thus, for example, when a provider of company information, goods and services introduces new services, special offers and so on, it is often very difficult for the target customer to obtain details of this. Also, it is very important in any information provider to the customer or targeted user of the information, that information be updated on a regular basis. Also, for many people engaged in industry, a particular problem is communicating between each other. For example, a few manufacturers might have problems in relation to the dumping of goods and unfair competition from outside the EU. They also might have concerns in relation to EU legislation and so on. It also would be very useful if such information could be readily available to people involved in the industry, for example, whether directly involved in shoe manufacturers or as retailers or agents. They also need to have some system whereby they can get into regular contact with each other and be regularly updated regarding the information available and the matters of concern in that industry.

Objects

In summary, there is a major need to provide information in relation to goods and services, which information can be used by, not alone prospective buyers, but also prospective sellers to such companies providing these goods and services. What everybody requires when obtaining information is to be able to narrow down the information and to target the information correctly. As the amount of information available on the internet increases exponentially, it is becoming more and more difficult for the users to obtain information specific to their needs without lengthy and costly searching, which searching is not, by any means, comprehensive.

The present invention is directed towards these aims.

SUMMARY OF THE INVENTION

The present invention relates to a directory system comprising a directory for company information and goods and services; a communications network; a directory computer operated by a directory provider; a plurality of search computers operated by enquirers which search computers are connected within the network; and a plurality of active content providers operating active content provider computers, at least some of which are connected to the directory computer. Strictly speaking, the directory of goods and services is a directory of company information linked to goods and services. In the invention the initial steps are performed of:— classifying company information, goods and services for which the information will be provided under unique identifiers;

obtaining a list of company information, goods and services as provider content which the active content providers wish to include in the directory;

obtaining a list of company information, goods and services provided by unconnected passive providers which the directory provider wishes to include as provider content in the directory;

allocating the unique identifiers to the provider content; and preparing a provider database of the provider content for active content providers and passive providers.

With that, the system has been set up and the method is ready for use and the method provides carrying out the steps of:— the search computer opens a communications link with the directory computer;

the directory computer downloads a search page containing a query heading;

the search computer enters onto the search page an initial search request;

the directory computer carries out a search through the provider database; and the directory computer downloads the provider content relevant to the search request as a search result;

and in which, as required from time to time:

the active content provider computers update the content of the provider database.

Generally speaking, the search request will be carried out by entering a word or words on the search page as an initial search request or as another search request but could in fact be by way of any drag and drop metaphor or indeed any clicking of multiple choice boxes the search computer enters onto the search page.

Obviously and to avoid any ambiguity, a reference to the updating of content by an active content provider can only refer to the updating of content within the control of the active content provider. The directory provider must have control over certain of the information provided and indeed the power to prevent the inclusion of, for example, content which is misleading or contrary to law.

Preferably the method is carried out in which:—
the directory computer downloads a list of the unique identifiers relevant to the search request;
the search computer chooses a unique identifier to initiate the downloading of providers content; and
the directory computer downloads the provider content stored with that unique identifier in the provider database.

The advantage of this for the enquirer is that the most comprehensive directory possible is provided, while at the same time, by having the active content providers computer update the content of the provider database on a regular basis, the consumer should obtain up to date information.

By providing detailed information from the active provider computers, these sites are much more valuable to the searcher than the other sites which give minimal information on passive content providers.

Various ways of providing the unique identifiers may be provided such as basing them on the company information and the types of goods and services being supplied or required, which is a logical way of doing this, or the by category of user based on the enquirers requirements in relation to information. The advantage of this is that a searcher will be only given that information that he or she requires.

In one method according to the invention on the search computer opening communication with the directory computer, the search computer specifies the enquirers requirements by category of user. The use of a system whereby the category of user is specified can be extremely advantageous in that it will ensure that for example if somebody is looking for employment, that they are not bombarded with offers for purchase of goods and so on.

In this latter method on a search computer specifying its category of user, then the provider content relevant to that category of user which is contained in a headline section of the active content providers is downloaded.

Ideally on opening communications with the directory system, the directory computer downloads a search recording panel, as each search page is entered, the search recording panel is updated to record the search criteria.

In one way of carrying out the invention the search recording panel is displayed on portion of the screen of the search computer each time the search page is displayed.

Preferably on completion of a search, the search recording panel is stored, but very often on completion of a search, the enquirer edits the provider content downloaded and again in this latter embodiment the provider content downloaded is stored.

In one embodiment of the invention when the initial search request includes more than one unique identifier, the steps are carried out of:—
sorting the provider content into groups having the same unique identifier;
searching the groups to ascertain the content providers appearing in more than one group;
taking the content provider or providers listed in the most groups;
sorting those groups as a first classification list of content providers;
repeating the process until there is a final classification list of content providers listed in only one group; and
downloading the provider content for each of these lists to the enquirer computer.

Preferably the directory computer stores the search computer ID in a separate search recording database;
and on the content of the provider database being updated, the steps are performed of:—
the directory computer searches the search recording database;
the previous enquiries requesting content that has now been updated are retrieved and the new content is downloaded to the relevant search computers.

In one method according to the invention the directory computer stores the search computer ID in a separate recording database;
and on an active content provider updating its own content, the steps are performed of:—
the active content provider computer requests that previous enquirers be updated with the new content;
the directory computer searches the search recording database;
the previous enquiries requesting content that has now been updated are retrieved and the new content is downloaded to the relevant search computers.

Ideally prior to downloading new content the directory sends a message to the search computer querying whether an update is required.

It is also envisaged that the search computer can indicate that it does not require the new content as it arises. Very often the search computer IDs are deleted after a preset time.

In another method according to the invention the search computer sends a request to the directory computer for an update of provider content and in which the directory computer downloads changes in content since the previous downloading of provider content to the search computer.

Further the invention provides a method based directory system comprising:
a directory computer operated by a directory provider and including a directory of goods and services classified by unique identifiers and containing information on the company information and its goods and services in a provider database with the information distinguished between that supplied by active content providers and that obtained about unconnected passive providers;
at least one search computer for operation by an enquirer;
at least one active content provider computer operated by an active content provider;
a communications network interconnecting the computers;
said search computer being programmed to receive and store initiation data including a search page and a query heading;
said directory computer being programmed to carry out a search through the provider database in response to a request from the search computer and to download the requested data to the search computer; and
said active content provider computer being programmed to update the content of the provider database insofar as it relates to the data stored concerning the goods and services provided by the active content provider.

Further the invention comprises a computerised method for the supply of information comprising:
- receiving a request from a search computer for information related to at least one of a list of goods and services stored by a processor in a provider database;
- transmitting a search page to the search computer in response to the request;
- receiving a further request from the search computer and transmitting a further search page until the search computer defines the information required;
- transmitting the required information; and
- receiving from time to time information from active content provider computers to update the information in the provider database.

Further the invention provides a computerised method for the supply of information from a directory comprising:

(A) initialising a provider database comprising:
- classifying company information, goods and services for which information will be provided under unique identifiers;
- entering into a provider database a list of company information, goods and services as provider content which active providers wish to include in the directory;
- entering into the provider database a list of company information, goods and services provided by passive content providers;
- allocating unique identifiers to the provider contents;

(B) receiving an information request from a search computer operated by an enquirer comprising:
- identifying the search computer;
- recording the ID of the search computer;
- maintaining a searcher profile database;

(C) transmitting the information requested comprising:
- sending a search page to the search computer said search page containing a query heading;
- receiving a response from the search computer detailing the precise information requested;
- downloading the information;

(D) updating the provider content comprising:
- opening a communicators link with the active content provider computer;
- allowing the active content provider computer access to the information specific to active providers' company information, goods and services in the provider database;
- accepting a revised list of company information, goods and services from the active provider computer;
- reclassifying the company information, goods and services now provided; and
- entering the revised lists of company information, goods and services in the provider database.

Additionally the invention provides a directory system for providing information on company information, goods and services provided by active and passive content providers comprising:
- means for storing information on company information, goods and services provided by passive content providers;
- means for receiving and storing information provided by active content providers;
- means for classifying the information on company information, goods and services stored;
- means for receiving a request from an enquirer for information on company information, goods and services;
- means for classifying the request with the same classification as that under which the information is stored;
- means for carrying out a search through the information stored by matching the classification of the request with that of the information stored;
- means for downloading the appropriate information in response to the search; and
- means for upgrading the information provided by the active content providers in response to a request from an active content provider.

Additionally the invention comprises a method for an enquirer to obtain information from a directory system comprising a directory for company information, goods and services; a communications network; a directory computer operated by a directory provider; and a plurality of active content providers operating active content provider computers, at least some of which are connected to the directory computer; in which the directory system includes:—
- a classification of company information, goods and services for which the information will be provided under unique identifiers;
- a list of company information, goods and services as provider content which the active content providers have included and which are updated from time to time by the active content provider computers;
- a list of company information, and goods and services provided by unconnected passive providers which the directory provider includes as provider content in the directory;
- unique identifiers allocated by the directory computer to the provider content in the directory;
- a provider database of the provider content for active content providers and passive providers;

the method comprising using a search computer connected within the network and carrying out the steps of:
- the search computer opens a communications link with the directory computer;
- the directory computer downloads a search page containing a query heading;
- the search computer enters a word or words onto the search page as an initial search request;
- the directory computer carries out a search through the provider database; and the directory computer downloads the provider content relevant to the search request as a search result.

BRIEF DESCRIPTION OF THE DRAWINGS

The invention will be more clearly understood from the following description of some examples of the invention, given by way of example only with reference to the accompanying drawings, in which:

FIGS. 4 to 20 are layouts of various screens that would be shown to the users when carrying out a search according to the invention.

DESCRIPTION OF THE PREFERRED EMBODIMENTS

Figure 1:
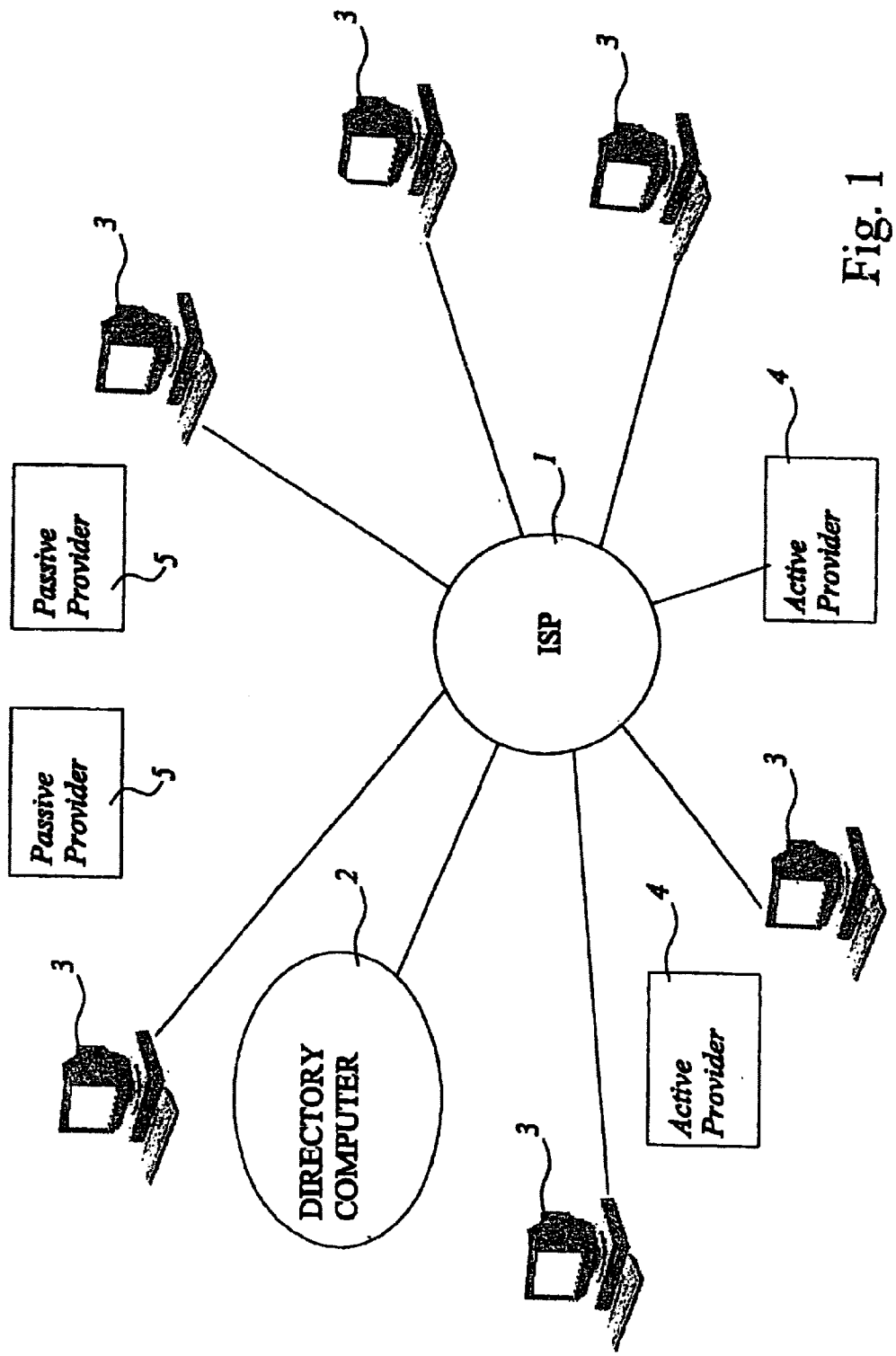
FIG. 1 is a layout of a directory system according to the invention.

Referring to the drawings and initially to FIG. 1, there is illustrated an internet service provider (ISP) 1 connected to a directory computer 2 and to enquirers each having search computers 3. A plurality of active provider computers 4 are connected to the ISP 1. One of the active content providers 4 is shown connected to the ISP by interrupted lines because the invention allows for the active content providers 4 to supply information indirectly to the Directory Computer in the sense of not being directly through the ISP. Finally, there is illustrated various passive providers, identified by the reference numeral 5. It will be noted that the passive providers may be connected to the internet but they are not shown connected because they are not connected by the ISP 1 to the directory computer 2.

To a certain extent in the discussion, there is an overlap between, for example, content providers and enquirers and their respective computers. However, since, in each case, hardware is used, it is easier to refer to the hardware than to continually make a distinction between the people operating the hardware and the hardware itself.

Figure 2:
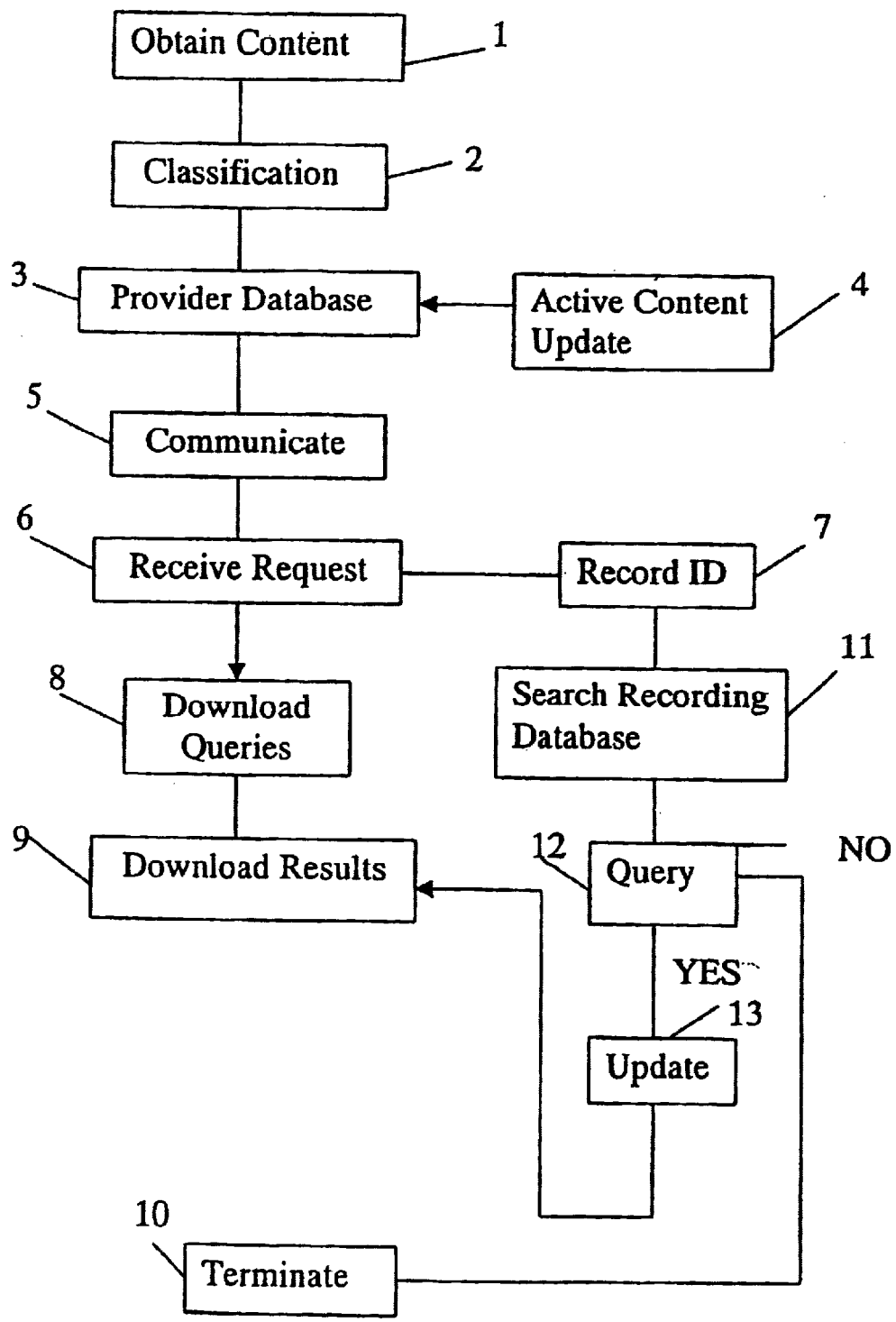
FIG. 2 is a flowchart showing the operation of the system in broad outline.

Referring now to FIG. 2, there is illustrated in flowchart form, a set-up of the method according to the present invention and its general use. In step 1, the directory provider obtains information on goods and services which can be provided by manufacturers, retailers, service companies, etc. The directory provider separates these into two namely active content providers and passive content providers. Active content providers, as will be described hereinafter, are able to update the contents of their information at will and further, generally pay a fee to the directory provider, for such a service. Passive content providers are essentially companies who have information available but do not wish to participate actively in the server. These passive content providers may, in step 1, actually present the information to the directory provider or may not present it directly to the directory provider who will then obtain it from some other source such as industry classifications or other data. The active content providers will supply the information directly to the directory provider and will in due course be connected directly to the directory provider which directory provider will initially, in step 2, classify the goods and service for which information will be provided by way of unique identifiers. The directory computer will be suitably programmed to make the necessary classification.

As everybody is aware, there are various classifications of company information, goods and services available. Examples are the international classification of goods and services for the filing and registration of trade marks, for patent applications and for various data collection agencies such as census operators, company information they are classified by, industry bodies and the like. Indeed, company information can be classified in various ways. For example, company information can be by size, by type of company whether they are a public liability company, a State organisation, a government department or a partnership. Similarly, companies can be classified by the industry in which they are in or the type of operations that they carry out such as service companies, primary producers, retail organisations, and so on, and any reference in this specification to the classification of goods and services also relates to the classification of company information. Reference to goods and services, as mentioned already, also relates, where appropriate, to information on the company per se. However, in step 2, the directory provider will prepare a suitable classification or classifications of the various company information, goods and services for which information will be given. Then, these will be used to classify the provider content, either received from active content providers or from passive content providers. In step 3, these will all be placed into a provider database to which the active content providers, in step 4, will be directly connected so that the active content providers can update the information in relation to their company information, goods and services at any time without delay. This can be done either through the directory provider computer or may be done directly by the active content provider's own computer. Thus, in step 3, there is established a database having provider content for active content providers and passive content providers.

In step 5, when a user wishes to use the directory, the user or search computer communicates with the directory computer and in step 6, the directory computer receives the request and in step 7, records the ID of the search computer. In step 8, the directory computer downloads various search pages containing query headings to the search computer and the search computer will then enter a word or words into the search page to define the search. Then in step 9 the directory computer will download the information requested namely the search results to the search computer. In step 10 the search is terminated. As explained, in step 7, the directory computer records the searcher's ID and this ID and the actual search results will be recorded in step 11. In step 12, when the content of the provider database is updated, the directory computer will query whether any of the stored search results have been affected by the update and will ask enquirers whose stored searches have been so affected as to whether they require an update of the previous search results and if no, step 10 will be carried out while if an update is required then the previous search results will be updated in step 13 and previous steps 9 and 10 repeated. This querying may be done by email. Such an option is particularly valuable particularly where there is a need to have up to date information. Similarly if an update is of no interest the last thing the consumer wants is to receive constant updates of irrelevant data.

Figure 3:
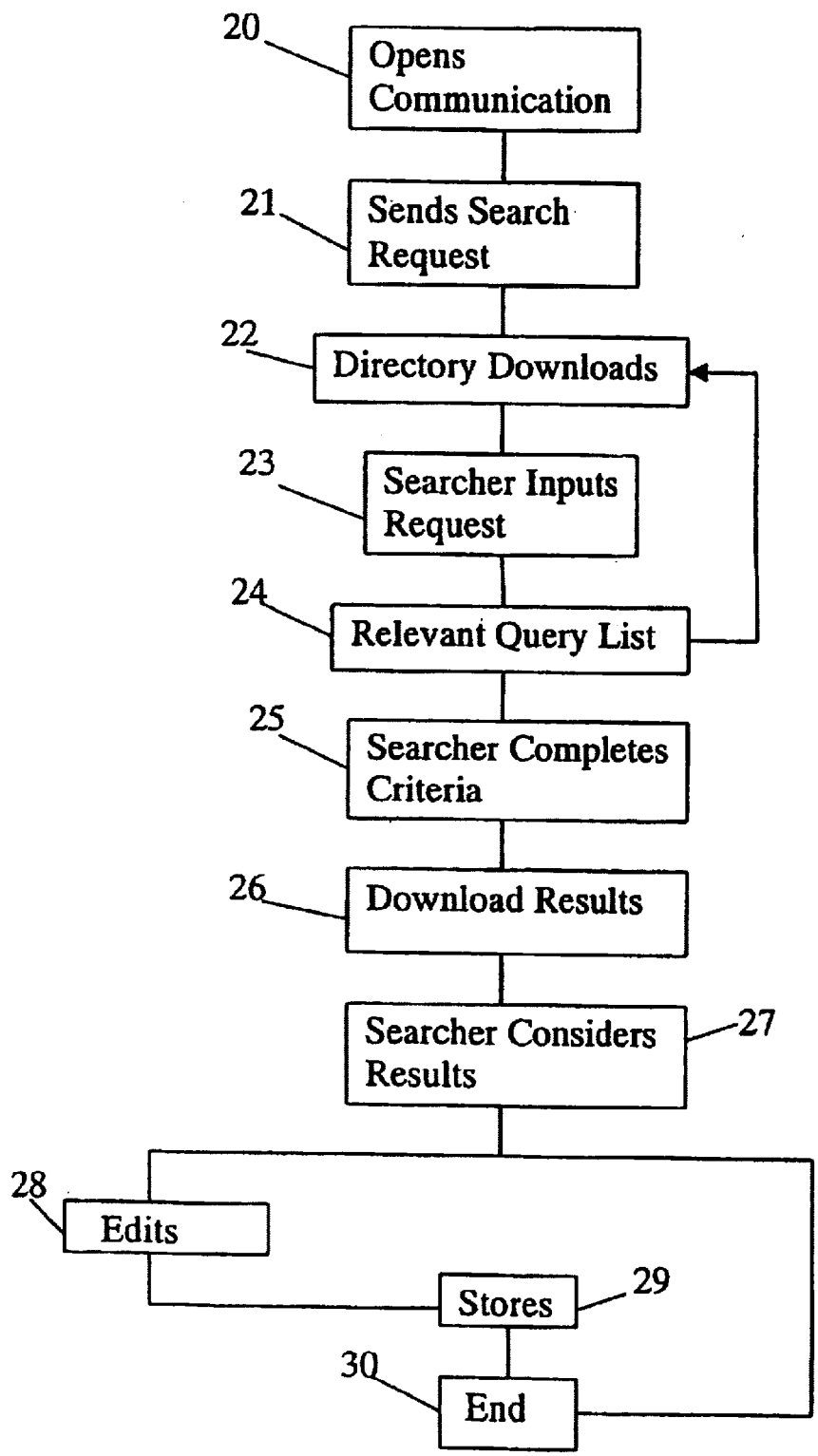
FIG. 3 is another flowchart showing use of the method according to the invention.
Figure 9:

Referring now to FIG. 3, part of essentially the same operation is shown again in somewhat more detail, purely from the user's viewpoint and incorporating the additional functions of editing and storing of search results. In step 20, the user opens communication with the directory provider (step 5, FIG. 2) and in step 21, sends a search request. In step 22, the directory downloads search criteria to the searcher. In step 23, the searcher inputs the necessary request for the search and in step 24 a relevant query list is downloaded to the searcher. The searcher then fills in the query list, this is returned to the directory and again this step is repeated with refined or new criteria until the searcher, in step 25, completes the search criteria. In step 26, the search results are downloaded. In step 27, the searcher considers the results and can, in step 28, edit and alter the results and in step 29, store the results. Alternatively, the searcher may simply store all the results in step 29 without any editing. Then, in step 30, whether there has been editing or not, the enquirer can end the search. Alternatively, the enquirer can decide not to do any storage or editing but simply to carry out step 30 after he or she has considered the search results.

Optionally, a user can decline to have his or her ID recorded. However, category of enquirer will normally always be recorded.

Referring now to FIGS. 4 to 18, there are illustrated various searches that can be carried out. FIGS. 4, 5 and 6 show the headings that would be used to allow people to obtain the information they want. Firstly, it will be noted that there are various criteria under which they can search. One of the main criteria is to define clearly what the searcher requires by defining which category the user falls into. Do they want to buy from companies, do they want to sell to the company, and so on. They are also asked whether they want to search, for example, to use the newsroom in relation to certain industries, use the discussion room, use what is here referred to as a briefcase which is simply a way of gathering and storing the information and it will also be noted that there are language change options. Referring again to FIGS. 4 to 6, it will be seen that if a search is to be carried out, it is possible for an enquirer to simply request a search for the provider content by a company name in which case some or all of the information stored about that company may be available. In other cases relating to a company search, the enquirer or user has to specify the purpose for which the search is being carried out so that the category of searcher can be specified and recorded. This is an important feature of the present invention.

The reason for having the category recorded is that this will allow the active content providers to clearly specify the information that they wish to give to each different category of enquirer. Thus, the active content provider can do this by way of specific information, here referred to as headlines, which information is directly targeted to the enquirer category. Not alone will the active content provider wish to provide the necessary headlines for specific enquirers but they will also wish to know what type of enquirer had been using these services. Such headlines can be used to highlight specific features of the content of relevance to specific enquirers. These will also be used for classification purposes.

FIG. 7 shows, for example, somebody having decided that they wish to buy from a company they are now being asked as to the company type which can be seen on the top right-hand corner under current search criteria. Then, they will choose what they require and having, for example, chosen retailer, then they will be asked to decide on location and this is shown in FIG. 8. It will now be seen that the searcher wishes to buy from retailers and in certain countries. Then, as can be seen, they are provided with a list of countries and at the next stage, in FIG. 9, it can be seen that the screen shows that the searcher wishes to consider buying from retailers in Italy and France and is then presented with a list of towns in France and as can be seen in FIG. 10, having chosen Paris as the only city in France, this much of the search criteria having been inputted, namely, the search category is to buy from retailers in Italy and Paris. Then, the searcher is asked what product or service he requires and this is inputted as can be seen under the heading "products and services" as shoes. This then causes the next screen of FIG. 11 to be displayed which shows the searcher now wants to buy from retailers in Italy, Paris and wants to buy shoes. There is now displayed various types of shoes and the searcher, for example, decides that he or she wishes to purchase ladies shoes and this is now shown in FIG. 12 where the searcher is further asked to refine the search which, in this particular instance, the searcher declines to do.

Then, we move to the screen of FIG. 13 where there are other options given and the searcher decides that he or she wishes to only purchase from retailers in Paris or Italy, ladies shoes from companies who have e-commerce facilities and this is then shown in FIG. 14. The searcher is then given certain other options as can be seen in FIG. 14. As can be seen from FIG. 14, the options of whether the searcher wishes to rank the results by an alphabetical listing, by revenue or by number of employees are given. Needless to say, other criteria or options could also be used. Thus, presuming that the searcher decides to have the ranking alphabetically, then in FIG. 15, there will be downloaded a page such as shown which is an alphabetical list of retailers selling ladies shoes in Italy or Paris who have e-commerce facilities. It will be seen from this list that, for example, A.B. SRL, Adriano Vila and Chaussures Broadway are all active providers who are delivering a message and other information. It will be easy for the searcher to contact the web address of any of these companies. At the same time, the passive providers which are the other companies, have the bare minimum information given.

As will be seen from FIG. 4, there are many other services and thus, for example, the service of discussion room, if chosen, could lead to pages being displayed such as FIGS. 16 and 17 and almost certainly in such a situation, there would be a facility to allow the searcher add his or her comments to the discussion as shown in the panel of FIG. 16.

Figure 18:

FIG. 18 shows, for example, the results following a search carried out by somebody who wishes to obtain employment as a computer programmer of C++ in the State of California, USA with a salary range greater than US$30,000 from a company with employees of less than 50 and in this particular search, the searcher has requested that the results be ranked by salary.

Figure 19:

Very often, having received the results of a search, the enquirer will wish to sort, rearrange or otherwise change the search. The searcher may wish, therefore, to edit the content received and this will be easily achieved. Further, the enquirer may wish to store the results of the search permanently in the briefcase. The briefcase also shows records of previous searches. FIG. 19 shows an unedited version of the previous page of FIG. 18 but, equally well, the enquirer, before finally storing the search in the briefcase, might, for example, delete one of the companies listed such as Computer Solutions Inc.

While in the various discussions previously, there has been a clear distinction between active content providers and passive content providers, there may in fact be what is in effect an overlap between the two and in particular an overlap in relation to the provision of headlines as referred to above. Some passive providers may not be directly connected to the system so as to allow the update of the content on the provider database, but they could effectively be so in the sense that a passive provider could provide headlines and other information to the directory operator who would in turn input that information into the directory computer in much the same way as an active content provider would input the information. In effect then the directory administrators or operators are operating in the same way as an active content provider would operate. Thus, these otherwise passive providers have in effect been transformed into at the least a form of active providers by this service. It will obviously be appreciated that this could be relatively easily done and this would then, as mentioned above, provide a cross-over between active content providers and totally unconnected passive providers. The important point to appreciate about this additional service is that for the user, the information provided by the passive content provider now more closely approximates that provided by the active content provider as they will be able to effectively provide information which will be relevant to the specific category of user or information of current impact e.g. a special offer. It is envisaged that this might be the preferred method for certain organisations who would not wish to become active content providers in the sense they would not wish to be involved in directly updating their content, but would be quite willing to allow some third party do it for them. Effectively then they would be to all intents and purposes active content providers, except they would not have the direct computer link and real time updating opportunities of active content providers.

In many instances, throughout the specification, there has been referred to the use of various database such as, for example, a separate search recording database and so on. The fact that, in many instances, they are called "separate" does not mean that they would not all be combined in the one database. Generally speaking, there will be only the one database which will store both the recording panel and the search computer IDs. Each recording panel will be permanently linked to its appropriate search computer ID and there will obviously be more than one recording panel for each ID. It is possible that by coincidence, there could be two search computers carrying out identical searches which will mean there could be recorded two identical searches against separate different IDs. It should be appreciated that since the search recording panel will have all the search criteria loaded into it, it forms in effect a proxy for the search itself and its complete search results can be immediately called upon from it at any time thus ensuring that the search recording database in the directory computer does not have to hold in memory all of the various search results themselves. Instead, the panels can be called up anytime on updating of the provider content taking place and can be quickly searched for any matches. When these are found, the corresponding IDs attached to the relevant panels can be notified. Thus, when an enquirer wishes to update a particular search, he or she only has to re-load his panel and the updated result will automatically appear. This re-loading operation, it is envisaged, could be easily carried out by the directory computer on receiving a suitable request.

The briefcase is a very important feature of the present invention as the storage of searches may be particularly useful for the enquirer.

It is envisaged that the job of storage and indeed many of the functions of the present invention, can be shared between the directory computer and the ISP computer. The amount of work carried out and the amount of storage will depend entirely on the way in which the system has been arranged.

It will be appreciated that the search results, whether saved by the search computer, edited or not, can be used for other purposes such as emailing them to a head office or for the purposes of creating a mail shot to various addresses such as, for example, the addresses shown in the search results and that the directory can be programmed in such a way as to facilitate such direct action.

It will be appreciated that one of the great advantages of the present invention is that the directory provider will classify the company information, goods and services in such a way as to make it very convenient to search and that further, because the searching will be precise, it will be attractive for content providers to have an active connection to the directory provider and thus be able to give updates on their company and the services and products being provided in real time.

It is also a particular feature of the present invention that the user also classifies himself or herself by choosing his or her user category to ensure that the search results can relate directly to their needs. Thus, it will be noted that as well as the normal unique identifiers based on the types of company information, goods and services involved in the search, the directory will have regard to the user category specified by the enquirer. This facility to specify the enquirer's user category is one of the very unique features of this invention and it alone makes this directory totally different to any other business directory.

In conventional Internet situations, all enquirers, irrespective of their particular interests, are presented with one fixed set of company information based on whatever request relating to goods, services or geographical location are entered by the enquirer.

In general, the company information provided in such situations assumes that all enquirers are buyers.

There is no service which we are aware of which for instance that gives different information to an enquirer depending on whether he has, for instance, been identified as a buyer rather than a seller of products or services.

Some sites may give very comprehensive information which could be of interest to both buyers, sellers and others, but such sites do not limit their information to specifically that which is only of direct value to only one of these user categories as is done in the present invention.

In the case of this invention, the search results will have been pre-loaded into their headlines by the active content providers in order to enable the directory computer to distinguish and to respond to not just conventional "unique identifiers" such as the enquirer's geographical area of interest, but uniquely, what kind of enquirer has approached the directory.

Put more simply, the "user category" identifies the purpose for which the user has approached the directory and the directory responds by providing only the appropriate headlines and/or information which had been previously loaded into the directory by the active content providers. These headlines will relate directly to the searcher's purpose in going to the directory in the first place.

Where company details from passive content providers fit the unique identifiers entered by the enquirer, these will also be included in the search result, but such companies will not of course display any of the commercially valuable headlines displayed by the active content providers within the same search result.

Figure 20:
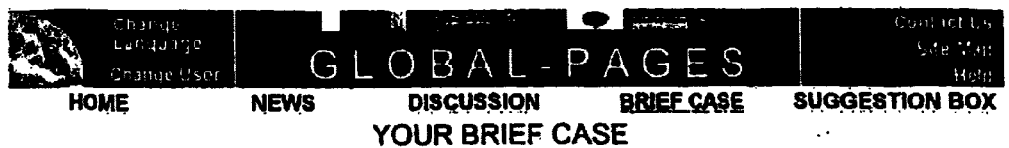

This feature can be seen from FIG. 20 where the left-hand column of information, based on the unique identifiers specified in this search gives the passive information which would be available from most conventional directories, and the right-hand column of information consists of headline information which is of specific value to an enquirer who has specified that he wants to sell wheels with castors to potential buyers in Germany or France.

Further, it will be noted that it is envisaged, as can be seen in FIGS. 19 and 20, that previous searches can also be listed. Ideally, these search recording panels are stored.

Figure 12:
Figure 15:

It is also envisaged that where the initial search includes more than one unique identifier such as, for example, dealing with the screen displayed in FIG. 12, a searcher might wish to have ladies leather shoes, ladies sports shoes and ladies casual shoes and thus the searcher would click a number of criteria or in this particular case, would delete other product categories. Then, what the directory provider computer would do would be to sort all the provider contents into groups having the same unique identifier, then search the groups to ascertain the content providers appearing in more than one group and then take the content providers listed in the most groups and put that as a first list and continue to sort the content providers until all the content providers were listed in groups. Thus, for example, the first group would show all those with the three criteria mentioned above, the next with only two and finally, those with only one. Thus, the searcher could try first to contact and get information on those companies able to supply ladies shoes in the three particular categories.

It is envisaged that in certain cases, not all searchers wish to have the content of searches updated automatically and may prefer to only update the search when they so require.

In certain situations, such as searches for employment, special offers, and business opportunities, the search results will consist exclusively of information from active content providers. No information from passive content providers will appear in these search results.

The search results can be a list of companies and company information identified as being associated with specific products or services, some of which company information also includes 'headline information' on special offers, new product launches, specific executive contact details and other information of interest to specific user category groups. The term search results has a very broad meaning.

It is important to appreciate that within the general terminology of company information, goods and services, there is included any other information such as the headline information referred to above. Equally well, it could actually be information on goods and services that a company required rather than wish to supply or on staff they wanted or on anything else relevant to the company's operation. Any reference in this specification to the updating, deleting, changing and so on, of company information and information on goods and services or simply company information on goods and services is to be taken as covering all these forms of information. Some of these latter forms of information such as, for example, headline information, may be more important than any others.

While considerable distinction has been drawn between active and passive content providers it is envisaged that over time an increasingly larger proportion of the companies feature in the directory will be active rather than passive content providers. Indeed the invention at some stage in the future may only provide information from active content providers.

Equally, active content providers may wish to have downloaded to each searcher, the content that they have updated immediately it is updated. Both of these requirements may be met.

In the specification the terms "comprise, comprises, comprised and comprising" or any variation thereof and the terms "include, includes, included and including" or any variation thereof are considered to be totally interchangeable and they should all be afforded the widest possible interpretation.

The invention is not limited to the embodiments hereinbefore described but may be varied in method of operation within the scope of the claims.

What is claimed is:

1. A method of providing information in a directory system comprising a directory for company information, goods and services; a communications network; a directory computer operated by a directory provider; a plurality of search computers operated by enquirers which search computers are connected within the network; and a plurality of active content providers operating active content provider computers, at least some of which are connected to the directory computer; in which the initial steps are performed of:
    classifying company information, goods and services for which the information will be provided under unique identifiers;
    obtaining a list of company information, goods and services as provider content which the active content providers wish to include in the directory;
    obtaining a list of company information, goods and services provided by unconnected passive providers which the directory provider wishes to include as provider content in the directory;
    allocating the unique identifiers to the provider content;
    preparing a provider database of the provider content for active content providers and passive providers;
    and in which the steps are subsequently performed of:
    the search computer opens a communications link with the directory computer;
    the directory computer downloads a search page containing a query heading;
    the search computer enters onto the search page an initial search request;
    the directory computer carries out a search through the provider database; and
    the directory computer downloads the provider content relevant to the search request as a search result;
    and in which, when the initial search request includes more than one unique identifier, the steps are carried out of:
    sorting the provider content into groups having the same unique identifier;
    searching the groups to ascertain the content providers appearing in more than one group;
    taking the content provider or providers listed in the most groups;
    sorting those groups as a first classification list of content providers;
    repeating the process until there is a final classification list of content providers listed in only one group; and
    downloading the provider content for each of these lists to the enquirer computer;
    and in which, as required from time to time:
    the active content provider computers update the content of the provider database.

2. A method as claimed in claim 1, in which:
    the directory computer downloads a list of the unique identifiers relevant to the search request;
    the search computer chooses a unique identifier to initiate the downloading of providers content; and
    the directory computer downloads the provider content stored with that unique identifier in the provider database.

3. A method as claimed in claim 1, in which the provider content in the provider database for the content providers includes detailed information on the company information, goods and services provided.

4. A method as claimed in claim 1, in which the unique identifiers are based on the company information and the types of goods and services.

5. A method as claimed in claim 1, in which the unique identifiers are by category of user based on the enquirers requirements for information.

6. A method as claimed in claim 1, in which, on the search computer opening communication with the directory computer, the search computer specifies the enquirers requirements by category of user.

7. A method as claimed in claim 1, in which, on the search computer opening communication with the directory computer, the search computer specifies the enquirers requirements by category of user and then only the provider content relevant to that category of user supplied by the active content providers is downloaded.

8. A method as claimed in claim 1, in which, on opening communications with the directory system, the directory computer downloads a search recording panel, as each search page is entered, the search recording panel is updated to record the search criteria.

9. A method as claimed in claim 1, in which, on opening communications with the directory system, the directory computer downloads a search recording panel, as each search page is entered, the search recording panel is updated to record the search criteria and is displayed on portion of the screen of the search computer each time the search page is displayed.

10. A method as claimed in claim 1, in which, on opening communications with the directory system, the directory computer downloads a search recording panel which is displayed on portion of the screen of the search computer and as each search page is entered, the search recording panel is updated to record the search criteria.

11. A method as claimed in claim 1, in which, on opening communications with the directory system, the directory computer downloads a search recording panel, as each search page is entered, the search recording panel is updated to record the search criteria and on completion of a search, the search recording panel is stored.

12. A method as claimed in claim 1, in which, on opening communications with the directory system, the directory computer downloads a search recording panel, as each search page is entered, the search recording panel is updated to record the search criteria said search recording panel is displayed on portion of the screen of the search computer each time the search page is displayed and on completion of a search the search recording panel is stored.

13. A method as claimed in claim 1, in which on completion of a search, the enquirer edits the provider content downloaded.

14. A method as claimed in claim 1, in which the provider content downloaded is stored.

15. A method as claimed in claim 1, in which the directory computer stores the search computer ID in a separate search recording database;
and on the content of the provider database being updated, the steps are performed of:
the directory computer searches the search recording database; and
the previous enquiries requesting content that has now been updated are retrieved and the new content is downloaded to the relevant search computers.

16. A method as claimed in claim 1, in which the directory computer stores the search computer ID in a separate search recording database;
and on the content of the provider database being updated, the steps are performed of:
the directory computer searches the search recording database; and
the previous enquiries requesting content that has now been updated are retrieved, the directory sends a message to the relevant search computer querying whether an update is required and if requested the new content is downloaded to the relevant search computers.

17. A method as claimed in claim 1, in which the directory computer stores the search computer ID in a separate search recording database;
and on the content of the provider database being updated and unless the search computer has previously indicated it does not require new content as it arises, the steps are performed of:
the directory computer searches the search recording database; and
the previous enquiries requesting content that has now been updated are retrieved and the new content is downloaded to the relevant search computers.

18. A method as claimed in claim 1, in which the directory computer stores the search computer ID in a separate recording database;
and on an active content provider updating its own content, the steps are performed of:
the active content provider computer requests that previous enquirers be updated with the new content;
the directory computer searches the search recording database; and
the previous enquiries requesting content that has now been updated are retrieved and the new content is downloaded to the relevant search computers.

19. A method as claimed in claim 1 in which the directory computer stores the search computer ID in a separate recording database;
and on an active content provider updating its own content, the steps are performed of:
the active content provider computer requests that previous enquirers be updated with the new content;
the directory computer searches the search recording database; and
the previous enquiries requesting content that has now been updated are retrieved the directory computer sends a message to the relevant search computer querying whether an update is required and if requested the new content is downloaded to the relevant search computers.

20. A method as claimed in claim 1 in which the directory computer stores the search computer ID in a separate recording database;
and on an active content provider updating its own content and unless the search computer has previously indicated it does not require new content as it arises, the steps are performed of:
the active content provider computer requests that previous enquirers be updated with the new content;
the directory computer searches the search recording database; and
the previous enquiries requesting content that has now been updated are retrieved and the new content is downloaded to the relevant search computers.

21. A method as claimed in claim 1, in which, the search computer sends a request to the directory computer for an update of provider content and in which the directory computer downloads changes in content since the previous downloading of provider content to the search computer.

22. A method of providing information in a directory system comprising a directory for company information, goods and services; a communications network; a directory computer operated by a directory provider; a plurality of search computers operated by enquirers which search computers are connected within the network; and a plurality of active content providers operating active content provider computers, at least some of which are connected to the directory computer; in which the initial steps are performed of:
classifying company information, goods and services for which the information will be provided under unique identifiers;
obtaining a list of company information, goods and services as provider content which the active content providers wish to include in the directory;
obtaining a list of company information, goods and services provided by unconnected passive providers which the directory provider wishes to include as provider content in the directory;

allocating the unique identifiers to the provider content;

preparing a provider database of the provider content for active content providers and passive providers;

and in which the steps are subsequently performed of:

the search computer opens a communications link with the directory computer;

the directory computer downloads a search page containing a query heading;

the search computer enters onto the search page an initial search request;

the directory computer downloads a list of the unique identifiers relevant to the search request;

the search computer chooses a unique identifier to initiate the downloading of providers content;

the directory computer carries out a search through the provider database;

the directory computer downloads the provider content as a search result;

and in which, when the initial search request includes more than one unique identifier, the steps are carried out of:

sorting the provider content into groups having the same unique identifier;

searching the groups to ascertain the content providers appearing in more than one group;

taking the content provider or providers listed in the most groups;

sorting those groups as a first classification list of content providers;

repeating the process until there is a final classification list of content providers listed in only one group; and downloading the provider content for each of these lists to the enquirer computer;

and in which, as required from time to time:

the active content provider computers update the content of the provider database.

23. A method as claimed in claim 22, in which the provider content in the provider database for the content providers includes detailed information on the company information and goods and services provided.

24. A method as claimed in claim 22, in which the unique identifiers are based on types of goods and services.

25. A method as claimed in claim 22, in which the unique identifiers are by category of user based on the enquirers requirements for information.

26. A method as claimed in claim 22, in which, on the search computer opening communication with the directory computer, the search computer specifies the enquirers requirements by category of user.

27. A method as claimed in claim 22, in which, on the search computer opening communication with the directory computer, the search computer specifies the enquirers requirements by category of user and then only the provider content relevant to that category of user supplied by the active content providers is downloaded.

28. A method as claimed in claim 22, in which, on opening communications with the directory system, the directory computer downloads a search recording panel, as each search page is entered, the search recording panel is updated to record the search criteria.

29. A method as claimed in claim 22, in which, on opening communications with the directory system, the directory computer downloads a search recording panel, as each search page is entered, the search recording panel is updated to record the search criteria and is displayed on portion of the screen of the search computer each time the search page is displayed.

30. A method as claimed in claim 22, in which, on opening communications with the directory system, the directory computer downloads a search recording panel which is displayed on portion of the screen of the search computer and as each search page is entered, the search recording panel is updated to record the search criteria.

31. A method as claimed in claim 22, in which, on opening communications with the directory system, the directory computer downloads a search recording panel, as each search page is entered, the search recording panel is updated to record the search criteria and on completion of a search, the search recording panel is stored.

32. A method as claimed in claim 22, in which, on opening communications with the directory system, the directory computer downloads a search recording panel, as each search page is entered, the search recording panel is updated to record the search criteria said search recording panel is displayed on portion of the screen of the search computer each time the search page is displayed and on completion of a search the search recording panel is stored.

33. A method as claimed in claim 22, in which on completion of a search, the enquirer edits the provider content downloaded.

34. A method as claimed in claim 22, in which the provider content downloaded is stored.

35. A method as claimed in claim 22, in which the directory computer stores the search computer ID in a separate search recording database;

and on the content of the provider database being updated, the steps are performed of:

the directory computer searches the search recording database; and the previous enquiries requesting content that has now been updated are retrieved and the new content is downloaded to the relevant search computers.

36. A method as claimed in claim 22, in which the directory computer stores the search computer ID in a separate search recording database;

and on the content of the provider database being updated, the steps are performed of:

the directory computer searches the search recording database; and the previous enquiries requesting content that has now been updated are retrieved, the directory sends a message to the relevant search computer querying whether an update is required and if requested the new content is downloaded to the relevant search computers.

37. A method as claimed in claim 22, in which the directory computer stores the search computer ID in a separate search recording database;

and on the content of the provider database being updated and unless the search computer has previously indicated it does not require new content as it arises, the steps are performed of:

the directory computer searches the search recording database; and the previous enquiries requesting content that has now been updated are retrieved and the new content is downloaded to the relevant search computers.

38. A method as claimed in claim 22 in which the directory computer stores the search computer ID in a separate recording database;

and on an active content provider updating its own content, the steps are performed of:
the active content provider computer requests that previous enquirers be updated with the new content;
the directory computer searches the search recording database; and
the previous enquiries requesting content that has now been updated are retrieved and the new content is downloaded to the relevant search computers.

39. A method as claimed in claim 22 in which the directory computer stores the search computer ID in a separate recording database;

and on an active content provider updating its own content, the steps are performed of:
the active content provider computer requests that previous enquirers be updated with the new content;
the directory computer searches the search recording database; and
the previous enquiries requesting content that has now been updated are retrieved the directory computer sends a message to the relevant search computer querying whether an update is required and if requested the new content is downloaded to the relevant search computers.

40. A method as claimed in claim 22, in which the directory computer stores the search computer ID in a separate recording database;

and on an active content provider updating its own content and unless the search computer has previously indicated it does not require new content as it arises, the steps are performed of:
the active content provider computer requests that previous enquirers be updated with the new content;
the directory computer searches the search recording database; and
the previous enquiries requesting content that has now been updated are retrieved and the new content is downloaded to the relevant search computers.

41. A method as claimed in claim 22, in which, the search computer sends a request to the directory computer for an update of provider content and in which the directory computer downloads changes in content since the previous downloading of provider content to the search computer.

42. A computerised method for the supply of information from a directory comprising:

(A) initialising a provider database comprising:
classifying company information, goods and services for which information will be provided under unique identifiers;
entering into a provider database a list of company information, goods and services as provider content which active providers wish to include in the directory;
entering into the provider database a list of company information, goods and services provided by passive content providers;
allocating unique identifiers to the provider contents;

(B) receiving an information request from a search computer operated by an enquirer comprising:
identifying the search computer;
recording the ID of the search computer;
maintaining a searcher profile database;

(C) transmitting the information requested comprising:
sending a search page to the search computer said search page containing a query heading;
receiving a response from the search computer detailing the precise information requested;
downloading the information;
and in which, when the initial search request includes more than one unique identifier, the steps are carried out of:
sorting the provider content into groups having the same unique identifier;
searching the groups to ascertain the content providers appearing in more than one group;
taking the content provider or providers listed in the most groups;
sorting those groups as a first classification list of content providers;
repeating the process until there is a final classification list of content providers listed in only one group; and
downloading the provider content for each of these lists to the enquirer computer;

(D) updating the provider content comprising:
opening a communicators link with the active content provider computer;
allowing the active content provider computer access to the information specific to active providers company information, goods and services in the provider database;
accepting a revised list of company information, goods and services from the active provider computer;
reclassifying the company information, goods and services now provided; and
entering the revised list of company information, goods and services in the provider database.

43. A method as claimed in claim 42, in which:
the directory computer downloads a list of the unique identifiers relevant to the search request;
the search computer chooses a unique identifier to initiate the downloading of providers content; and
the directory computer downloads the provider content stored with that unique identifier in the provider database.

44. A method as claimed in claim 42, in which the provider content in the provider database for the content providers includes detailed information on the company information, goods and services provided.

45. A method as claimed in claim 42, in which the unique identifiers are based on types of company information, goods and services.

46. A method as claimed in claim 42, in which the unique identifiers are by category of user based on the enquirers requirements for information on the company information, goods and services.

47. A method as claimed in claim 42, in which, on the search computer opening communication with the directory computer, the search computer specifies the enquirers requirements by category of user.

48. A method as claimed in claim 42, in which on completion of a search, the enquirer edits the provider content downloaded.

49. A method as claimed in claim 42, in which the provider content downloaded is stored.

50. A method as claimed in claim 42, in which the directory computer stores the search computer ID in a separate search recording database;

and on the content of the provider database being updated, the steps are performed of:
the directory computer searches the search recording database;

the previous enquiries requesting content that has now been updated are retrieved and the new content is downloaded to the relevant search computers.

51. A method as claimed in claim 42, in which the directory computer stores the search computer ID in a separate recording database;
and on an active content provider updating its own content, the steps are performed of:
the active content provider computer requests that previous enquirers be updated with the new content;
the directory computer searches the search recording database;
the previous enquiries requesting content that has now been updated are retrieved and the new content is downloaded to the relevant search computers.

52. A directory system for providing information on company information, goods and services provided by active and passive content providers comprising:
means for storing information on company information, goods and services provided by passive content providers;
means for receiving and storing information provided by active content providers;
means for classifying the information on company information, goods and services stored;
means for receiving a request from an enquirer for information on company information, goods and services;
means for classifying the request with the same classification as that under which the information is stored;
means for carrying out a search through the information stored by matching the classification of the request with that of the information stored;
means for downloading the appropriate information in response to the search, in which, when the initial search request includes more than one unique identifier, the steps are carried out of:
sorting the provider content into groups having the same unique identifier;
searching the groups to ascertain the content providers appearing in more than one group;
taking the content provider or providers listed in the most groups;
sorting those groups as a first classification list of content providers;
repeating the process until there is a final classification list of content providers listed in only one group; and
downloading the provider content for each of these lists to the enquirer computer; and
means for upgrading the information provided by the active content providers in response to a request from an active content provider.

53. A system as claimed in claim 52, in which:
the directory computer includes means for downloading a list of the unique identifiers relevant to the search request;
the search computer includes means for choosing a unique identifier to initiate the downloading of providers content; and
the directory computer includes means for downloading the provider content stored with that unique identifier in the provider database.

54. A system as claimed in claim 52, in which the provider content in the provider database for the content providers includes detailed information on the company information, goods and services provided.

55. A system as claimed in claim 52, in which the unique identifiers are based on the company information and the types of goods and services.

56. A system as claimed in claim 52, in which the unique identifiers are by category of user based on the enquirers requirements for information.

57. A system as claimed in claim 52, in which, on the search computer opening communication with the directory computer, the search computer specifies the enquirers requirements by category of user.

58. A system as claimed in claim 52, in which on completion of a search, the enquirer edits the provider content downloaded.

59. A system as claimed in claim 52, in which the provider content downloaded is stored.

60. A system as claimed in claim 52, in which the directory computer stores the search computer ID in a separate search recording database;
and on the content of the provider database being updated, the steps are performed of:
the directory computer searches the search recording database;
the previous enquiries requesting content that has now been updated are retrieved and the new content is downloaded to the relevant search computers.

61. A system as claimed in claim 52 in which the directory computer stores the search computer ID in a separate recording database;
and on an active content provider updating its own content, the steps are performed of:
the active content provider computer requests that previous enquirers be updated with the new content;
the directory computer searches the search recording database;
the previous enquiries requesting content that has now been updated are retrieved and the new content is downloaded to the relevant search computers.

62. A method for an enquirer to obtain information from a directory system comprising a directory for company information, goods and services; a communications network; a directory computer operated by a directory provider; and a plurality of active content providers operating active content provider computers, at least some of which are connected to the directory computer; in which the directory system includes:
a classification of company information, goods and services for which the information will be provided under unique identifiers;
a list of company information, goods and services as provider content which the active content providers have included and which are updated from time to time by the active content provider computers;
a list of company information, goods and services provided by unconnected passive providers which the directory provider includes as provider content in the directory;
unique identifiers allocated by the directory computer to the provider content in the directory;
a provider database of the provider content for active content providers and passive providers;
the method comprising using a search computer connected within the network and carrying out the steps of:
the search computer opens a communications link with the directory computer;
the directory computer downloads a search page containing a query heading;
the search computer enters a word or words onto the search page as an initial search request;
the directory computer carries out a search through the provider database; and
the directory computer downloads the provider content relevant to the search request as a search result, in which, when the initial search request includes more than one unique identifier, the steps are carried out of:

sorting the provider content into groups having the same unique identifier;

searching the groups to ascertain the content providers appearing in more than one group;

taking the content provider or providers listed in the most groups;

sorting those groups as a first classification list of content providers;

repeating the process until there is a final classification list of content providers listed in only one group; and downloading the provider content for each of these lists to the enquirer computer.

63. A method as claimed in claim 62, in which:

the directory computer downloads a list of the unique identifiers relevant to the search request;

the search computer chooses a unique identifier to initiate the downloading of providers content; and the directory computer downloads the provider content stored with that unique identifier in the provider database.

64. A method as claimed in claim 62, in which the provider content in the provider database for the content providers includes detailed information on the company information, goods and services provided.

65. A method as claimed in claim 62, in which the unique identifiers are based on the company information and the types of goods and services.

66. A method as claimed in claim 62, in which the unique identifiers are by category of user based on the enquirers requirements for information.

67. A method as claimed in claim 62, in which, on the search computer opening communication with the directory computer, the search computer specifies the enquirers requirements by category of user.

68. A method as claimed in claim 62, in which, on the search computer opening communication with the directory computer, the search computer specifies the enquirers requirements by category of user and then only the provider content relevant to that category of user supplied by the active content providers is downloaded.

69. A method as claimed in claim 62, in which, on opening communications with the directory system, the directory computer downloads a search recording panel, as each search page is entered, the search recording panel is updated to record the search criteria.

70. A method as claimed in claim 62, in which, on opening communications with the directory system, the directory computer downloads a search recording panel, as each search page is entered, the search recording panel is updated to record the search criteria and is displayed on portion of the screen of the search computer each time the search page is displayed.

71. A method as claimed in claim 62, in which, on opening communications with the directory system, the directory computer downloads a search recording panel which is displayed on portion of the screen of the search computer and as each search page is entered, the search recording panel is updated to record the search criteria.

72. A method as claimed in claim 62, in which, on opening communications with the directory system, the directory computer downloads a search recording panel, as each search page is entered, the search recording panel is updated to record the search criteria and on completion of a search, the search recording panel is stored.

73. A method as claimed in claim 62, in which, on opening communications with the directory system, the directory computer downloads a search recording panel, as each search page is entered, the search recording panel is updated to record the search criteria said search recording panel is displayed on portion of the screen of the search computer each time the search page is displayed and on completion of a search the search recording panel is stored.

74. A method as claimed in claim 62, in which on completion of a search, the enquirer edits the provider content downloaded.

75. A method as claimed in claim 62, in which the provider content downloaded is stored.

76. A method as claimed in claim 62, in which the directory computer stores the search computer ID in a separate search recording database;

and on the content of the provider database being updated, the steps are performed of:

the directory computer searches the search recording database;

the previous enquiries requesting content that has now been updated are retrieved and the new content is downloaded to the relevant search computers.

77. A method as claimed in claim 62, in which the directory computer stores the search computer ID in a separate search recording database;

and on the content of the provider database being updated, the steps are performed of:

the directory computer searches the search recording database;

the previous enquiries requesting content that has now been updated are retrieved, the directory sends a message to the relevant search computer querying whether an update is required and if requested the new content is downloaded to the relevant search computers.

78. A method as claimed in claim 62, in which the directory computer stores the search computer ID in a separate search recording database;

and on the content of the provider database being updated and unless the search computer has previously indicated it does not require new content as it arises, the steps are performed of:

the directory computer searches the search recording database;

the previous enquiries requesting content that has now been updated are retrieved and the new content is downloaded to the relevant search computers.

79. A method as claimed in claim 62 in which the directory computer stores the search computer ID in a separate recording database;

and on an active content provider updating its own content, the steps are performed of:

the active content provider computer requests that previous enquirers be updated with the new content;

the directory computer searches the search recording database;

the previous enquiries requesting content that has now been updated are retrieved and the new content is downloaded to the relevant search computers.

80. A method as claimed in claim 62 in which the directory computer stores the search computer ID in a separate recording database;

and on an active content provider updating its own content, the steps are performed of:

the active content provider computer requests that previous enquirers be updated with the new content;

the directory computer searches the search recording database;

the previous enquiries requesting content that has now been updated are retrieved the directory computer sends a message to the relevant search computer querying whether an update is required and if requested the new content is downloaded to the relevant search computers.

81. A method as claimed in claim 62 in which the directory computer stores the search computer ID in a separate recording database;

and on an active content provider updating its own content and unless the search computer has previously indicated it does not require new content as it arises, the steps are performed of:

the active content provider computer requests that previous enquirers be updated with the new content;

the directory computer searches the search recording database;

the previous enquiries requesting content that has now been updated are retrieved and the new content is downloaded to the relevant search computers.

82. A method as claimed in claim 62, in which, the search computer sends a request to the directory computer for an update of provider content and in which the directory computer downloads changes in content since the previous downloading of provider content to the search computer.

* * * * *